(12) United States Patent
Singh

(10) Patent No.: US 11,290,406 B1
(45) Date of Patent: Mar. 29, 2022

(54) SELECTING AN OPTIMAL COMBINATION OF PORTIONS OF A CONTENT ITEM TO BE PRESENTED WITHIN A USER INTERFACE OF AN ONLINE MESSAGING APPLICATION IN ASSOCIATION WITH INFORMATION IDENTIFYING A SET OF MESSAGE THREADS

(71) Applicant: Meta Platforms, Inc., Menlo Park, CA (US)

(72) Inventor: Dheeraj Kumar Singh, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/734,399

(22) Filed: Jan. 5, 2020

(51) Int. Cl.
*H04L 12/58* (2006.01)
*G06F 16/2457* (2019.01)
*G06F 11/34* (2006.01)
*H04L 51/00* (2022.01)

(52) U.S. Cl.
CPC .......... *H04L 51/16* (2013.01); *G06F 11/3409* (2013.01); *G06F 16/24578* (2019.01)

(58) Field of Classification Search
CPC . H04L 51/16; G06F 11/3409; G06F 16/24578
See application file for complete search history.

(56) References Cited

U.S. PATENT DOCUMENTS

| | | | | |
|---|---|---|---|---|
| 8,918,404 | B1 * | 12/2014 | Dachille | G06F 16/958 707/748 |
| 9,569,432 | B1 * | 2/2017 | Marra | G06F 16/9535 |
| 9,715,901 | B1 * | 7/2017 | Singh | H04N 21/8456 |
| 2008/0235589 | A1 * | 9/2008 | Shaw | G06F 16/4387 715/723 |
| 2013/0013418 | A1 * | 1/2013 | Novikov | G06Q 30/0244 705/14.66 |
| 2013/0041750 | A1 * | 2/2013 | Ye | G06Q 30/02 705/14.52 |
| 2013/0127920 | A1 * | 5/2013 | Grinshpon | G06F 3/14 345/661 |
| 2014/0278308 | A1 * | 9/2014 | Liu | H04L 67/22 703/6 |
| 2015/0120761 | A1 * | 4/2015 | Lounsbury | G06F 3/04842 707/751 |
| 2016/0283585 | A1 * | 9/2016 | Zheng | G06F 16/345 |
| 2016/0350310 | A1 * | 12/2016 | Jurka | G06F 16/24578 |

* cited by examiner

*Primary Examiner* — Ario Etienne
*Assistant Examiner* — Kamal Hossain
(74) *Attorney, Agent, or Firm* — Fenwick & West LLP

(57) ABSTRACT

A different combination of multiple portions of a content item is selected for display to each of multiple sets of users of an online messaging application. The different combination of portions of the content item is sent for display to the corresponding set of users within a user interface of the online messaging application in association with information identifying a set of message threads in which each user is participating. A request to view the entire content of the content item is then received from a subset of each of the sets of users and a performance metric associated with each combination of portions of the content item is tracked based on the received request. Based on the performance metric, a performance of each portion of the content item is evaluated and used to select an optimal combination of the portions of the content item.

20 Claims, 4 Drawing Sheets

SELECTING AN OPTIMAL COMBINATION OF PORTIONS OF A CONTENT ITEM TO BE PRESENTED WITHIN A USER INTERFACE OF AN ONLINE MESSAGING APPLICATION IN ASSOCIATION WITH INFORMATION IDENTIFYING A SET OF MESSAGE THREADS

TECHNICAL FIELD

This disclosure relates generally to online messaging applications, and more specifically to selecting an optimal combination of portions of a content item to be presented within a user interface of an online messaging application in association with information identifying a set of message threads.

BACKGROUND

Online messaging applications allow their users to communicate by sending messages to each other via the online messaging applications. Messages sent between the same group of users of an online messaging application may be part of a message thread. Each message thread in which a user of an online messaging application is participating may be identified by various types of information presented within a user interface of the online messaging application. Examples of these types of information include the names and/or profile images of one or more other users of the online messaging application participating in the message thread, a time at which a most recent message in the message thread was received, a portion or a subject of the most recent message in the message thread, etc. To continue a conversation via the online messaging application, the user may select information identifying a corresponding message thread from the user interface, which opens the message thread within the user interface and allows the user to compose a message to be added to the message thread.

To encourage user engagement with online messaging applications, the online messaging applications may present content items to their users with which the users are likely to engage. A content item may be presented to a user of an online messaging application within a user interface of the online messaging application in association with information identifying message threads in which the user is participating. However, since the user interface may list several message threads in which the user is participating, only a limited area of the user interface may be occupied by the content item. Furthermore, shrinking or resizing a dimension of the content item to fit within this limited area of the user interface may reduce the likelihood of user engagement with the content item (e.g., if text included in the content item becomes unreadable, if an image included in the content item becomes unrecognizable, etc.).

Consequently, only portions of a content item may be presented within a user interface of an online messaging application and the entire content of the content item may be presented upon receiving a request from a user of the online messaging application to view the entire content. However, some portions of a content item may be more likely to encourage user engagement with the content item than others. Therefore, user engagement with an online messaging application may decrease if portions of a content item presented to users of the online messaging application are portions with which the users are unlikely to engage.

SUMMARY

Online messaging applications allow their users to communicate by sending messages to each other via the online messaging applications, in which messages sent between the same group of users may be part of a message thread. To encourage user engagement with the online messaging applications, content items with which the users are likely to engage may be presented to the users within user interfaces of the online messaging applications in association with information identifying message threads in which the users are participating. However, only some portions of the content items may be presented within limited areas of the user interfaces and since some portions of the content items may be more likely to encourage user engagement than others, user engagement with the online messaging applications may decrease if the users are unlikely to engage with the portions of the content items that are presented.

To address this issue, a different combination of multiple portions of a content item is selected for display to each of multiple sets of users of an online messaging application. The different combination of portions of the content item is sent for display to the corresponding set of users within a user interface of the online messaging application in association with information identifying a set of message threads in which each user is participating. A request to view the entire content of the content item is then received from a subset of each of the sets of users and a performance metric associated with each combination of portions of the content item is tracked based on the received request. Based on the performance metric, a performance of each portion of the content item is evaluated and an optimal combination of the portions of the content item is selected based on the performance of each portion of the content item. One or more of the steps described above may be performed at an online system associated with the online messaging application, at a server associated with the online messaging application, and/or at a client device associated with a user of the online messaging application.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
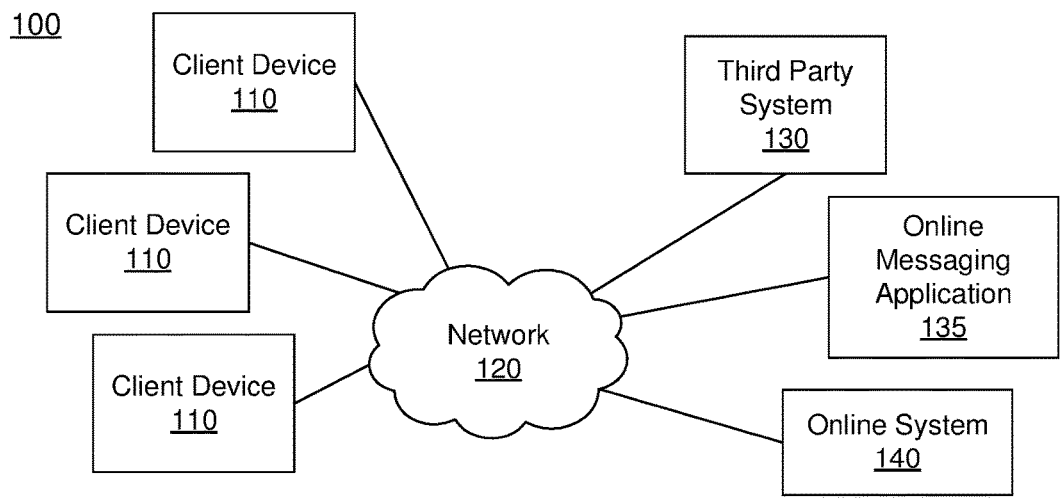
FIG. 1 is a block diagram of a system environment in which an online messaging application operates, in accordance with an embodiment.

FIG. 1 is a block diagram of a system environment 100 for an online messaging application 135. The system environment 100 shown by FIG. 1 comprises one or more client devices 110, a network 120, one or more third-party systems 130, the online messaging application 135, and an online system 140 associated with the online messaging application 135. In alternative configurations, different and/or additional components may be included in the system environment 100. In some embodiments, the online system 140 may be a social networking system associated with the online messaging application 135.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online messaging application 135 and/or the online system 140. For example, a client device 110 executes a browser application to enable interaction between the client device 110 and the online messaging application 135 and/or the online system 140 via the network 120. In another embodiment, a client device 110 interacts with the online messaging application 135 and/or the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online messaging application 135 and/or the online system 140, which are further described below. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online messaging application 135 and/or the online system 140, such as advertisements, content, or information about an application provided by the third-party system 130.

The online messaging application 135 is coupled to the network 120, allowing the online messaging application 135 to communicate with the client devices 110, the third-party system(s) 130, and/or the online system 140. In some embodiments, the online messaging application 135 may be coupled to the network 120 via a server associated with the online messaging application 135. In such embodiments, the server may include one or more components analogous to those of the online system 140, which are described below in conjunction with FIG. 2. Furthermore, in some embodiments, information maintained at and/or received at the online messaging application 135 may be communicated to or accessed by the online system 140, and vice versa.

The online messaging application 135 may allow its users to communicate by sending messages to each other using client devices 110 associated with the users. In some embodiments, the online messaging application 135 also may allow entities (e.g., businesses and organizations) to have a presence on the online messaging application 135, such that messages may be communicated to and from the entities via the online messaging application 135. Messages communicated between the same group of users of the online messaging application 135 and/or entities having a presence on the online messaging application 135 may be part of a message thread. Each message included in a message thread may include various types of data, (e.g., text data, image data, video data, audio data, etc.).

In some embodiments, the online messaging application 135 also may include additional types of functionality. In one embodiment, the online messaging application 135 also may support additional types of communication (e.g., telephone calls, video calls, etc.). In another embodiment, the online messaging application 135 also may allow its users to react to messages (e.g., with emojis, by expressing a preference for the messages, etc.). In yet another embodiment, the online messaging application 135 may allow its users to interact with bots (e.g., bots that answer questions on behalf of business entities having a presence on the online messaging application 135). The online messaging application 135 also may have functionality that allows its users to play games (e.g., with other users of the online messaging application 135), to make purchases, or to perform any other suitable types of actions within the online messaging application 135. Furthermore, the online messaging application 135 may protect the privacy of its users by encrypting messages sent between the users (e.g., via end-to-end encryption).

Figure 2:
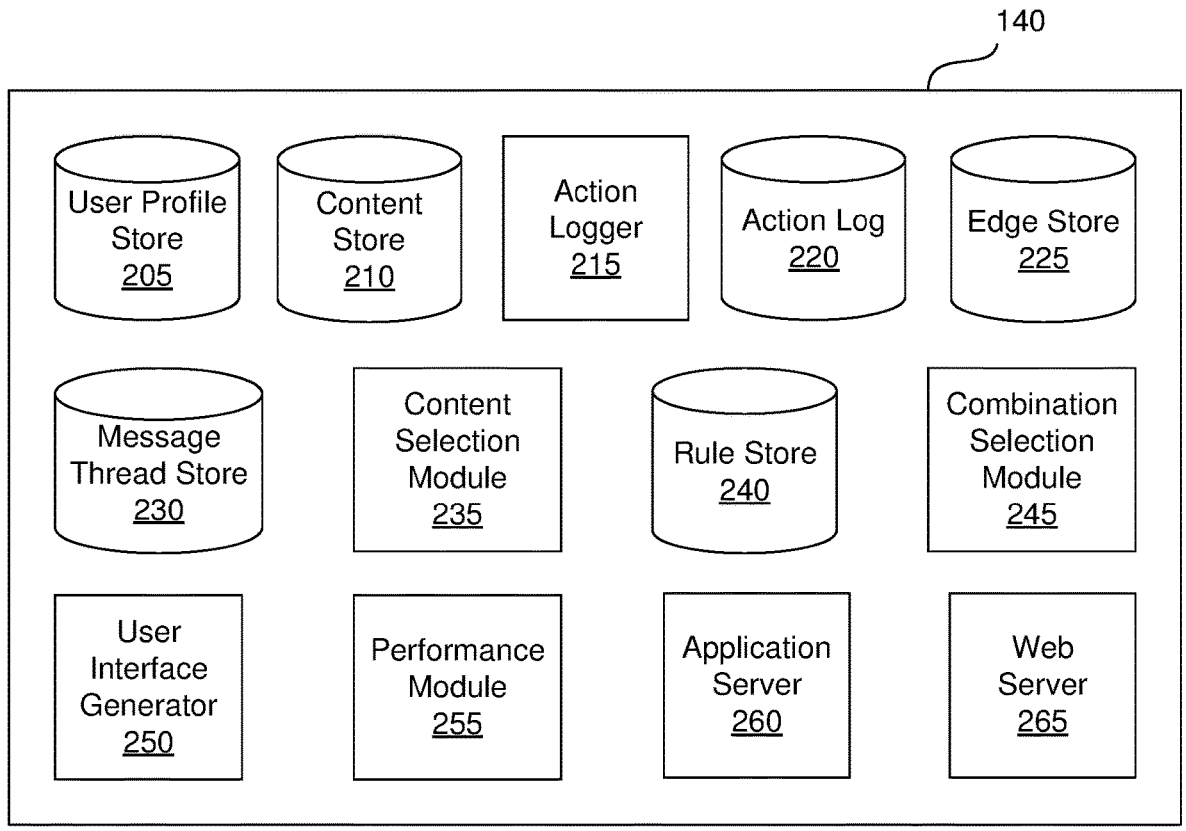
FIG. 2 is a block diagram of an online system associated with an online messaging application, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a message thread store 230, a content selection module 235, a rule store 240, a combination selection module 245, a user interface generator 250, a performance module 255, an application server 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online messaging application 135 and/or the online system 140 is associated with a user profile, which is stored in the user profile store 205. A user profile includes declarative information about the user that was explicitly shared by the user and also may include profile information inferred by the online messaging application 135 and/or the online system 140. In one embodiment, a user profile includes multiple data fields, each describing one or more attributes of the corresponding user of the online messaging application 135 and/or the online system 140. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the users of the online messaging application 135 and/or the online system 140 displayed in an image, with information identifying the images in which a user is tagged stored in the user profile of the user. A user profile in the user profile store 205 also may maintain references to actions by the corresponding user performed on content items in the content store 210 and stored in the action log 220.

In some embodiments, the user profile store 205 stores user-identifying information associated with users of the online messaging application 135 and/or the online system 140. Examples of such information may include an address (e.g., a home address), a phone number, an email address, a user identifier that is unique to a user in the online messaging application 135, in the online system 140, and/or in a third-party system 130 (e.g., a username, a user identification number, or a cookie identifier), a client device identifier (e.g., an IP address), a browser identifier (e.g., a user agent), etc. User-identifying information also may include information that potentially may be combined to identify a user of the online messaging application 135 and/or the online system 140. For example, user-identifying information associated with a user of the online messaging application 135 and/or the online system 140 may include a combination of the user's first name, age, hometown, educational background, and occupation.

While user profiles in the user profile store 205 frequently are associated with individuals, allowing individuals to interact with each other via the online messaging application 135 and/or the online system 140, user profiles also may be stored for entities such as businesses or organizations. This allows an entity to establish a presence in the online messaging application 135 and/or the online system 140 for connecting and exchanging content with other users of the online messaging application 135 and/or the online system 140. The entity may post information about itself, about its products or provide other information to users of the online messaging application 135 and/or the online system 140 using a brand page associated with the entity's user profile. Other users of the online messaging application 135 and/or the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Users of the online messaging application 135 and/or the online system 140 may create objects stored by the content store 210, such as status updates, photos tagged by users to be associated with other objects in the online messaging application 135 and/or the online system 140, events, groups or applications. In some embodiments, objects are received from third-party applications or third-party applications separate from the online messaging application 135 and/or the online system 140. In one embodiment, objects in the content store 210 represent single pieces of content, or content "items." Hence, users of the online messaging application 135 and/or the online system 140 are encouraged to communicate with each other by posting text and content items of various types of media to the online messaging application 135 and/or the online system 140 through various communication channels. This increases the amount of interaction of users with each other and increases the frequency with which users interact within the online messaging application 135 and/or the online system 140.

Each content item represented by an object stored in the content store 210 may include multiple portions. Examples of portions of a content item include a headline, a subtitle, one or more images, text content, one or more videos, one or more hyperlinks, one or more interactive elements, etc. For example, suppose that a content item is about a recent news event. In this example, a headline for the content item may correspond to a short statement describing the event, a subtitle for the content item may correspond to a subordinate title that gives additional information about the event, an image included in the content item may correspond to a photograph taken at the event, and text content included in the content item may correspond to a detailed description of the event. In the above example, the content item also may include a video corresponding to a video clip recorded by an eyewitness to the event, a hyperlink that may be used to access a website that includes an entire video from which the video clip was generated, and an interactive element that corresponds to a button that allows a user of the online messaging application 135 and/or the online system 140 to share the content item with other users of the online messaging application 135 and/or the online system 140.

The action logger 215 receives communications about user actions internal to and/or external to the online messaging application 135 and/or the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online messaging application 135 and/or the online system 140 to track user actions in the online messaging application 135 and/or the online system 140, as well as actions in third-party systems 130 that communicate information to the online messaging application 135 and/or the online system 140. Users may interact with various objects in the online messaging application 135 and/or the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online messaging application 135 and/or the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online messaging application 135 and/or the online system 140 as well as with other applications communicating with the online messaging application 135 and/or the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online messaging application 135 and/or the online system 140. For example, an e-commerce website may recognize a user of an online messaging application 135 and/or an online system 140 through a social plug-in enabling the e-commerce website to identify the user of the online messaging application 135 and/or the online system 140. Because users of the online messaging application 135 and/or the online system 140 are uniquely identifiable, e-commerce websites, such as in the preceding example, may communicate information about a user's actions outside of the online messaging application 135 and/or the online system 140 to the online messaging application 135 and/or the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online messaging application 135 and/or the online system 140.

In one embodiment, the edge store 225 stores information describing connections between users and other objects in the online messaging application 135 and/or the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online messaging application 135 and/or the online system 140, such as expressing interest in a page in the online system 140, sharing a link with other users of the online messaging application 135, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online messaging application 135 and/or the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online messaging application 135 and/or the online system 140 over time to approximate a user's interest in an object or in another user in the online messaging application 135 and/or the online system 140 based on the actions performed by the user. A user's affinity may be computed by the online messaging application 135 and/or the online system 140 over time to approximate the user's interest in an object, a topic, or another user in the online messaging application 135 and/or the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The message thread store 230 may store a set of messages included in each message thread between one or more users of the online messaging application 135 and/or the online system 140. Each message included in a message thread may include various types of data, such as text data (e.g., words or phrases), image data (e.g., emojis, GIFs, photos, stickers, etc.), video data, audio data (e.g., voice messages, music, etc.), files, hyperlinks, objects (e.g., page posts or articles), or any other suitable types of data that may be communicated via the online messaging application 135 and/or the online system 140. Each message included in a message thread and/or each message thread may be associated with various types of information that also may be stored in the message thread store 230. Examples of such information include information associated with each user participating in the message thread, such as user-identifying information stored in the user profile store 205, information associated with a client device 110 used to compose each message (e.g., a geographic location of the client device 110, an IP address associated with the client device 110, etc.), a time at which each message was sent or received, or any other suitable types of information. The message thread store 230 is further described below in conjunction with FIGS. 3A, 3B, and 4.

The content selection module 235 selects one or more content items for communication to a client device 110 to be presented to a viewing user of the online messaging application 135 and/or the online system 140. Content items eligible for presentation to the viewing user are retrieved from the content store 210 or from another source by the content selection module 235, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 235 includes content items eligible for presentation to the viewing user in one or more content selection processes, which identify a set of content items for presentation to the viewing user. For example, the content selection module 235 determines measures of relevance of various content items to the viewing user based on characteristics associated with the viewing user by the online messaging application 135 and/or the online system 140 and based on the viewing user's affinity for different content items. Based on the measures of relevance, the content selection module 235 selects content items for presentation to the viewing user. As an additional example, the content selection module 235 selects content items having the highest measures of relevance or having at least a threshold measure of relevance for presentation to the viewing user. Alternatively, the content selection module 235 ranks content items based on their associated measures of relevance and selects content items having the highest positions in the ranking or having at least a threshold position in the ranking for presentation to the viewing user.

Content items selected for presentation to a viewing user may be associated with bid amounts. The content selection module 235 may use the bid amounts associated with content items when selecting content for presentation to the viewing user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the online messaging application 135 and/or the online system 140 for presenting the content item. For example, the expected value associated with a content item is a product of the content item's bid amount and a likelihood of a viewing user presented with the content from the content item interacting with the content. The content selection module 235 may rank content items based on their associated bid amounts and select content items having at least a threshold position in the ranking for presentation to a viewing user. In some embodiments, the content selection module 235 ranks both content items not associated with bid amounts and content items associated with bid amounts in a unified ranking based on bid amounts and measures of relevance associated with content items. Based on the unified ranking, the content selection module 235 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a viewing user of the online messaging application 135 and/or the online system 140. The feed may include one or more advertisements as well as other content items, such as stories describing actions associated with other online messaging application users and/or other online system users connected to the viewing user. The content selection module 235 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 235 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 235 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online messaging application 135 and/or the online system 140.

In various embodiments, the online messaging application 135 and/or the online system 140 presents content to a viewing user through a newsfeed including a plurality of content items selected for presentation to the viewing user. One or more advertisements also may be included in the feed. The content selection module 235 may determine the order in which selected content items are presented via the feed. For example, the content selection module 235 orders advertisements or other content items in the feed based on likelihoods of the viewing user interacting with various content items. The functionality of the content selection module 235 is further described below in conjunction with FIGS. 3A and 3B.

The rule store 240 may store a set of rules that may be used by the combination selection module 245 (described below) to select a different combination of multiple portions of a content item for display to each of multiple sets of users of the online messaging application 135. For example, a rule stored in the rule store 240 may require that a headline included in a content item always be included among a combination of portions of the content item selected by the combination selection module 245. As an additional example, a rule stored in the rule store 240 may describe a maximum proportion of a user interface of the online messaging application 135 eligible to be occupied by one or more portions of a content item that may be selected by the combination selection module 245.

In some embodiments, a set of rules stored in the rule store 240 may be used by the combination selection module 245 to identify a set of candidate portions of a content item from which the combination selection module 245 may select different combinations of portions of the content item. The set of rules may identify the set of candidate portions of the content item based on a minimum or a maximum size (e.g., a font or an image size) that may be associated with portions of the content item, a maximum or minimum length (e.g., a video length) that may be associated with portions of the content item, or any other suitable criteria. For example, the set of rules may indicate that only text content of at least a given font size may be included among a set of candidate portions of a content item that may be selected by the combination selection module 245. As an additional example, the set of rules may indicate that only image content of at least a threshold resolution may be included among a set of candidate portions of a content item that may be selected by the combination selection module 245. The rule store 240 is further described below in conjunction with FIGS. 3A, 3B, and 4.

The combination selection module 245 may select (e.g., as shown in step 305 of FIGS. 3A and 3B) a different combination of multiple portions of a content item for display to each of multiple sets of users of the online messaging application 135. In some embodiments, the combination selection module 245 may make this selection randomly. Alternatively, the combination selection module 245 may make this selection based on one or more rules stored in the rule store 240. For example, suppose that a first rule stored in the rule store 240 requires a headline of a content item to be included among a combination of portions of the content item selected by the combination selection module 245. In this example, suppose also that a second rule stored in the rule store 240 describes a maximum proportion of one-fifth of a user interface of the online messaging application 135 that is eligible to be occupied by one or more portions of a content item that may be selected by the combination selection module 245. In the above example, the combination selection module 245 may select a particular combination of portions of a content item only if it occupies no more than one-fifth of the user interface of the online messaging application 135 and if it includes a headline of the content item.

The combination selection module 245 also may select (e.g., as shown in step 330 of FIGS. 3A and 3B) an optimal combination of multiple portions of a content item based on a performance of each portion of the content item. The performance of each portion of the content item may be evaluated by the performance module 255 (described below). In some embodiments, the combination selection module 245 may select the optimal combination of portions of the content item by ranking each portion of the content item based on a score associated with each portion of the content item that is computed by the performance module 255 and by selecting the optimal combination of portions of the content item based on the ranking. For example, the combination selection module 245 may rank portions of a content item based on a score associated with each portion of the content item from highest to lowest. In this example, the combination selection module 245 may then select portions of the content item associated with at least a threshold ranking or a threshold score to be included among the optimal combination of portions of the content item. In some embodiments, the combination selection module 245 also may determine an order in which an optimal combination of portions of a content item may be presented within a user interface of the online messaging application 135 based on the performance of each portion of the content item. In the above example, the order in which the optimal combination of portions of the content item may be presented within a user interface of the online messaging application 135 may correspond to the ranking, such that higher-ranked portions of the content item are presented in a higher position of the user interface than lower-ranked portions of the content item. The functionality of the combination selection module 245 is further described below in conjunction with FIGS. 3A, 3B, and 4.

The user interface generator 250 may generate a user interface of the online messaging application 135 in which information identifying a set of message threads in which a user of the online messaging application 135 is participating may be displayed. Information identifying message threads in which a user of the online messaging application 135 is participating may be presented within the user interface in chronological order based on a most recent message included in each message thread. For example, information identifying the message threads may be presented chronologically within the user interface, in which information identifying message threads including the newest messages is presented at the top of the user interface. In this example, as newer message threads are created and newer messages are added to existing message threads, information identifying the message threads may be rearranged within the user interface, such that information identifying message threads including the newest messages is always presented at the top of the user interface and information identifying older message threads may be viewed by scrolling downwards within the user interface. Each message thread in which a user of the online messaging application 135 is participating may be identified by various types of information maintained in the online system 140 (e.g., in the user profile store 205 and/or the message thread store 230) that may be accessed by the user interface generator 250 and used to generate the user interface. Examples of such information include the names and/or profile images of one or more other users participating in the message thread, a time at which a most recent message in the message thread was received, a portion or a subject of the most recent message in the message thread, etc.

In addition to presenting information identifying a set of message threads in which a user of the online messaging application 135 is participating, the user interface generated by the user interface generator 250 also may include a combination of multiple portions of a content item selected by the combination selection module 245. In some embodiments, a combination of portions of a content item may occupy a portion of the user interface that otherwise would be occupied by information identifying one or more message threads in which a user of the online messaging application 135 is participating. For example, suppose that information identifying message threads in which a user of the online messaging application 135 is participating is presented within the user interface in chronological order based on a most recent message included in each message thread, such that information identifying message threads including the newest messages is presented at the top of the user interface. In this example, a combination of portions of a content item may occupy a top portion of the user interface that otherwise would be occupied by information identifying the message thread including the newest message, such that information identifying each message thread is displaced downward within the user interface. In other embodiments, a combination of portions of a content item may be overlaid onto information identifying one or more message threads in which a user of the online messaging application 135 is participating. In the above example, the combination of portions of the content item may be overlaid onto information identifying one or more of the message threads in which the user is participating (e.g., in a pop-up window).

Various types of requests may be received from a user of the online messaging application 135 via the user interface generated by the user interface generator 250. In embodiments in which the user interface includes a combination of multiple portions of a content item selected by the combination selection module 245, the online messaging application 135 may receive a request from a user of the online messaging application 135 to view the entire content of the content item (e.g., upon receiving an interaction from the user with the selected portions or with an interactive element corresponding to the request). In such embodiments, in response to receiving the request, the user interface generator 250 may update the user interface to include the entire content of the content item. In embodiments in which the user interface includes a combination of multiple portions of a content item selected by the combination selection module 245, the online messaging application 135 also may receive a request from a user of the online messaging application 135 to perform an action associated with the content item (e.g., upon receiving an interaction from the user with an interactive element corresponding to the request). Examples of such actions include making a purchase associated with the content item, subscribing to a service associated with the content item, accessing a website associated with the content item, installing an application associated with the content item, claiming an offer associated with the content item, etc. The functionality of the user interface generator 250 is further described below in conjunction with FIGS. 3A, 3B, and 4.

The performance module 255 may track (e.g., as shown in step 320 of FIGS. 3A and 3B) a performance metric associated with a different combination of multiple portions of a content item selected for display to each of multiple sets of users of the online messaging application 135. The performance metric may be tracked based on a request to view the entire content of the content item that is received from a subset of a set of users to whom the combination of portions of the content item is presented. For example, for each combination of multiple portions of a content item sent for display to a set of users of the online messaging application 135, the performance module 255 may track a performance metric corresponding to a percentage of the set of users who requested to view the entire content of the content item. In some embodiments, the performance module 255 also may track a performance metric associated with a different combination of multiple portions of a content item selected for display to each of multiple sets of users of the online messaging application 135 based on a request received from a subset of each of the sets of users to perform one or more actions associated with the content item. Examples of such requests include requests to make a purchase associated with the content item, requests to subscribe to a service associated with the content item, requests to access a website associated with the content item, requests to install an application associated with the content item, requests to claim an offer associated with the content item, etc.

The performance module 255 also may evaluate (e.g., as shown in step 325 of FIGS. 3A and 3B) a performance of each of multiple portions of a content item. The performance module 255 may do so based on one or more performance metrics associated with one or more different combinations of portions of the content item tracked by the performance module 255. In some embodiments, to evaluate a performance of a portion of a content item, the performance module 255 may identify one or more different combinations of the portions of the content item that include the portion of the content item and access a performance metric associated with each of the different combinations of the portions of the content item. In such embodiments, the performance module 255 may then compute a score associated with the portion of the content item based on the performance metric(s). For example, to evaluate a performance of a portion of a content item corresponding to an image included in the content item, the performance module 255 may identify seven combinations of portions of the content item that include the image and access a performance metric associated with each of the seven identified combinations of portions of the content item. In this example, the performance module 255 may then compute a score associated with the image based on the performance metrics (e.g., by computing an average of the performance metrics). The functionality of the performance module 255 is further described below in conjunction with FIGS. 3A and 3B.

The application server 260 provides the software framework that the online messaging application 135 and/or the online system 140 runs upon. The application server 260 may serve business logic to the online messaging application 135 and/or the online system 140 through various protocols, including, but not limited to HTTP, as well as through application programming interfaces (APIs). The application server 260 manages its own resources and also may perform additional functions such as processing transactions, messaging, resource connection and pooling, and managing security tasks. In some embodiments, the application server 260 may use a communication protocol that enables near-real-time exchange of data between two or more client devices 110 (e.g., using Extensible Messaging and Presence Protocol (XMPP)). In some embodiments, the application server 260 is paired with the web server 265 (described below) while in other embodiments, the application server 260 includes the web server 265, forming a web application server.

The web server 265 links the online messaging application 135 and/or the online system 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online messaging application 135 and/or the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Figure 3A:
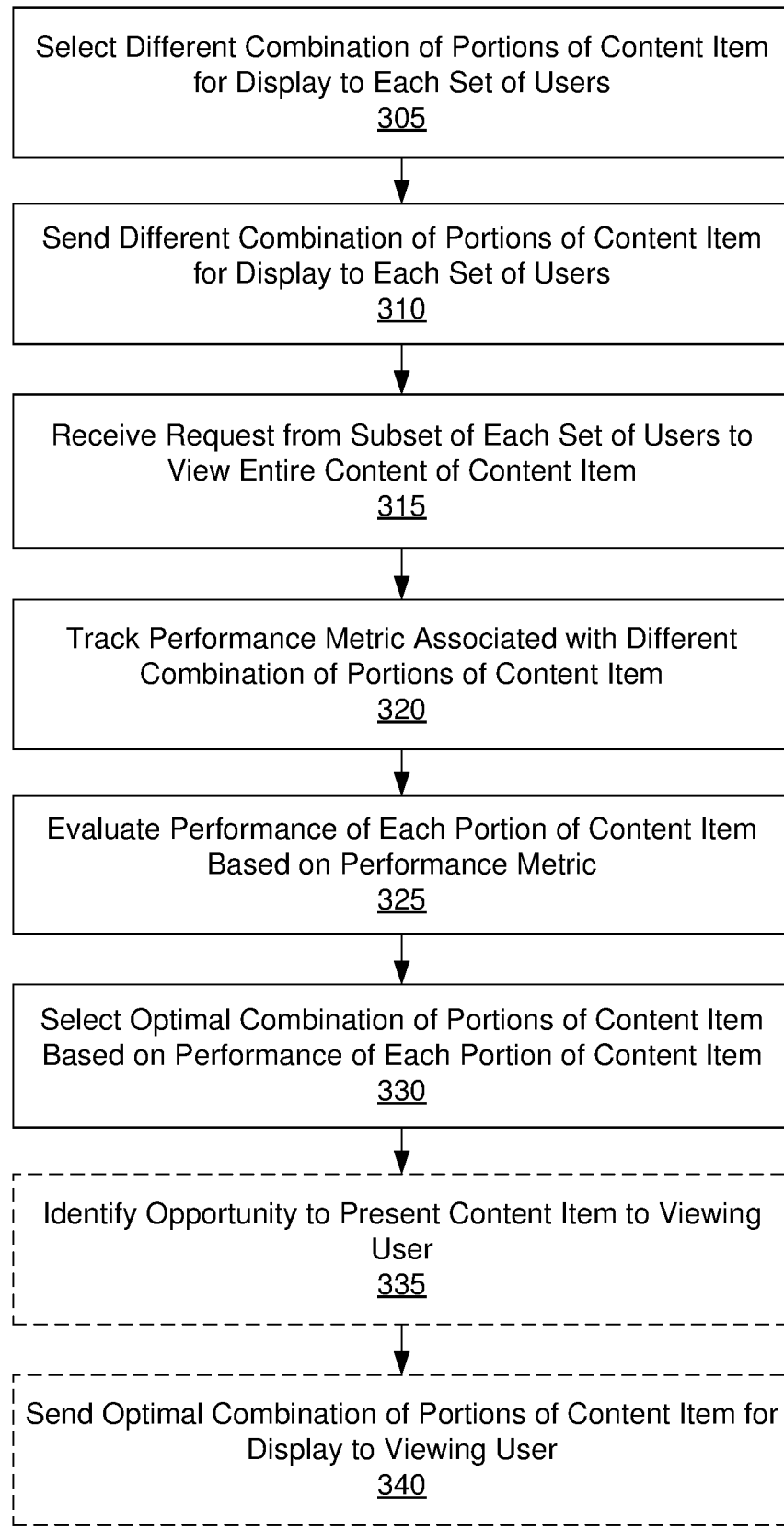
FIG. 3A is a flow chart of a method for selecting an optimal combination of portions of a content item to be presented within a user interface of an online messaging application in association with information identifying a set of message threads, in accordance with an embodiment.
Figure 3B:
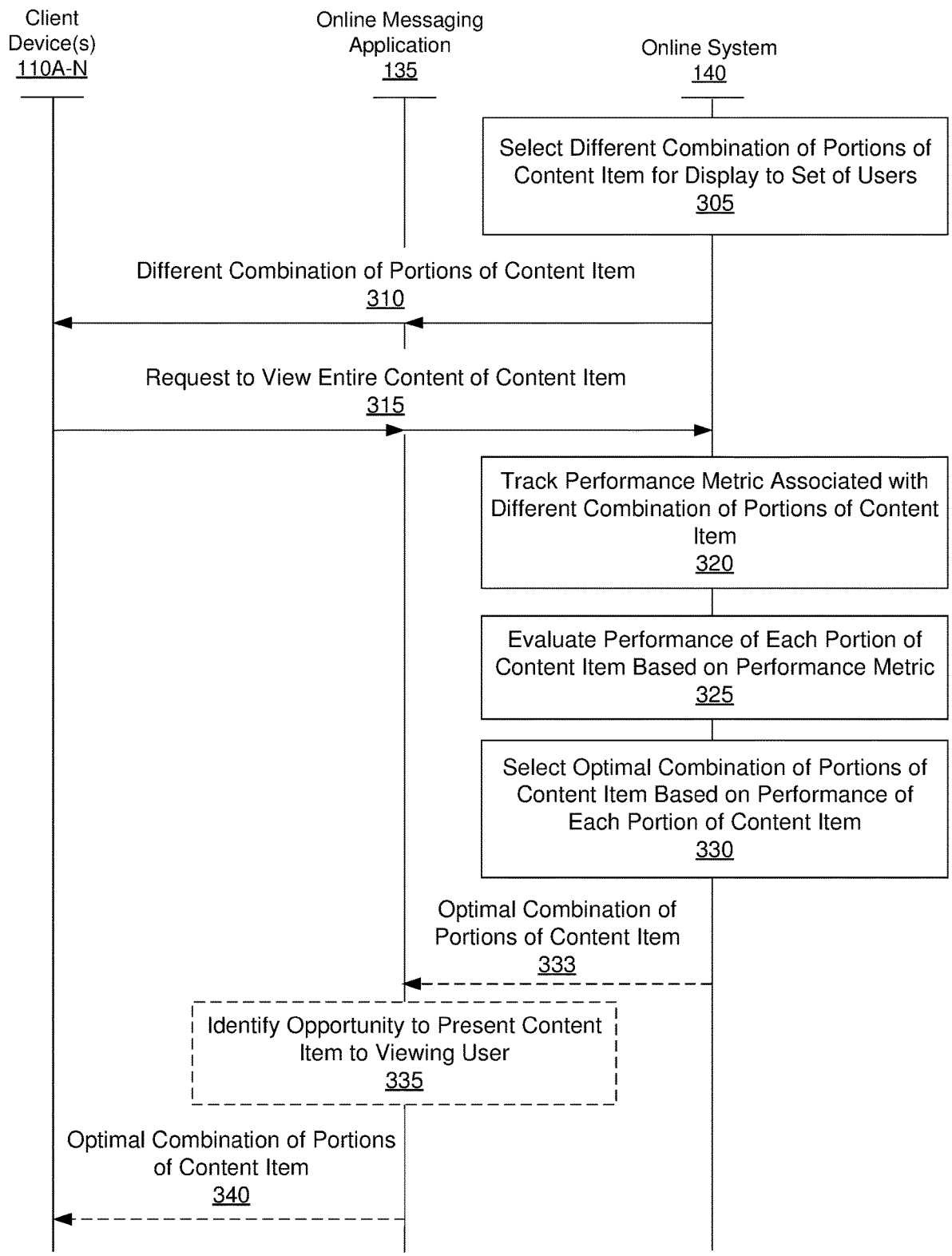
FIG. 3B is an interaction diagram of a method for selecting an optimal combination of portions of a content item to be presented within a user interface of an online messaging application in association with information identifying a set of message threads, in accordance with an embodiment.

Selecting an Optimal Combination of Portions of a Content Item to be Presented Within a User Interface of an Online Messaging Application in Association with Information Identifying a Set of Message Threads FIG. 3A is a flow chart of a method for selecting an optimal combination of portions of a content item to be presented within a user interface of an online messaging application in association with information identifying a set of message threads. FIG. 3B is an interaction diagram of a method for selecting an optimal combination of portions of a content item to be presented within a user interface of an online messaging application in association with information identifying a set of message threads. In other embodiments, the method may include different and/or additional steps than those shown in FIGS. 3A and 3B. Additionally, steps of the method may be performed in a different order than the order described in conjunction with FIGS. 3A and 3B.

Figure 4:
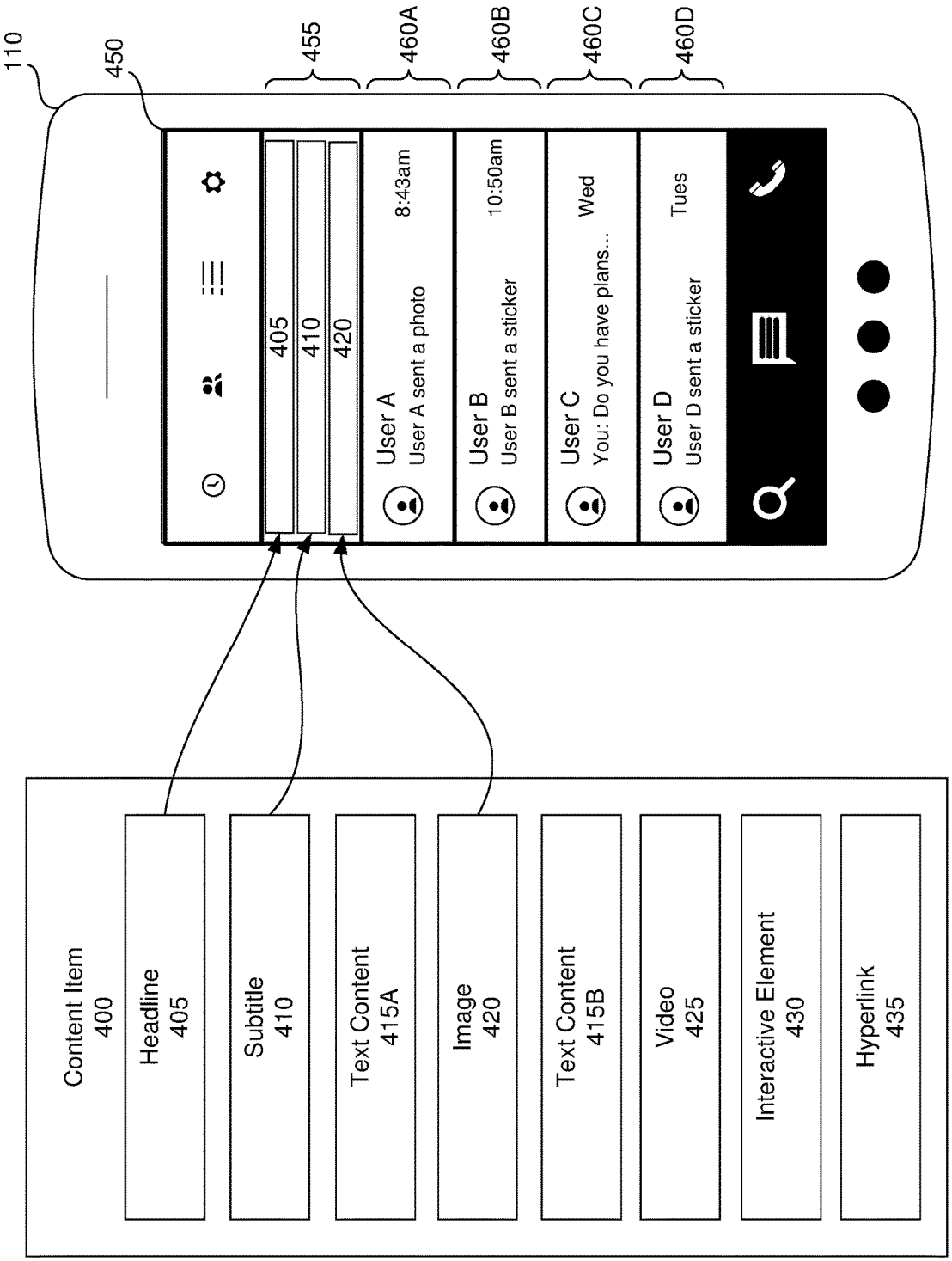
FIG. 4 is an example of a combination of portions of a content item presented within a user interface of an online messaging application in association with information identifying a set of message threads, in accordance with an embodiment.

Referring first to FIG. 3A, a different combination of multiple portions of a content item is selected 305 for display to each of multiple sets of users of the online messaging application 135. As shown in FIG. 3B, in some embodiments, each combination of portions of the content item may be selected 305 by the online system 140 (e.g., using the combination selection module 245). In other embodiments, each combination of portions of the content item may be selected 305 by the online messaging application 135 (e.g., using a component analogous to the combination selection module 245) or by a client device 110 associated with each of the users of the online messaging application 135. As shown in the example of FIG. 4, portions of the content item 400 may include a headline 405, a subtitle 410, text content 415A-B, an image 420, a video 425, an interactive element 430, and a hyperlink 435. As also shown in this example, a combination of portions of the content item 455 that is selected 305 for display to a set of users of the online messaging application 135 may include the headline 405, the subtitle 410, and the image 420. Each combination of portions of the content item may be selected 305 randomly or based on one or more rules (e.g., stored in the rule store 240 in the online system 140 or in an analogous component in the online messaging application 135). For example, a first rule may require a headline of the content item to be included among each combination of portions of the content item. In this example, a second rule also may specify that each combination of portions of the content item may occupy no more than one-fifth of a user interface of the online messaging application 135.

Referring back to FIG. 3A, the different combination of portions of the content item is then sent 310 for display to each of the sets of users. As shown in FIG. 3B, in embodiments in which the different combination of portions of the content item is selected 305 by the online system 140, the online system 140 may first send 310 the different combination of portions of the content item to the online messaging application 135. The online messaging application 135 may then send 310 the different combination of portions of the content item for display to each of the sets of users via client devices 110A-N associated with the users. Alternatively, in some embodiments, the online system 140 may send 310 the different combination of portions of the content item directly to the client devices 110A-N. In embodiments in which the different combination of portions of the content item is selected 305 by the online messaging application 135, the online messaging application 135 may send 310 the different combination of portions of the content item for display to the each of the sets of users via the client devices 110A-N associated with the users. In embodiments in which the different combination of portions of the content item is selected 305 by each client device 110 associated with each of the sets of users, the different combination of portions of the content item is sent 310 for display to each of the sets of users by the client device 110.

As shown in FIG. 4, the different combination of the portions of the content item 455 may be presented within a user interface 450 of the online messaging application 135 in association with information identifying a set of message threads 460A-D in which each user of the online messaging application 135 is participating. The user interface 450 may be generated by the online system 140 (e.g., based on information maintained in the user profile store 205 and/or the message thread store 230 using the user interface generator 250), by the online messaging application 135 (e.g., based on information maintained in components analogous to the user profile store 205 and/or the message thread store 230 using a component analogous to the user interface generator 250), or by a client device 110 associated with a user of the online messaging application 135 to whom the different combination of portions of the content item is sent 310. As illustrated in FIG. 4, the information identifying the message threads 460A-D is presented chronologically within the user interface 450, in which information identifying message threads 460A-D including the newest messages is presented at the top of the user interface 450. In this example, each message thread 460A-D is identified by the names and profile images of one or more other users participating in the message thread 460A-D, a time at which a most recent message in the message thread 460A-D was received, and a portion or a subject of the most recent message in the message thread 460A-D. Furthermore, as shown in this example, a combination of portions of the content item 455 may occupy a portion of the user interface 450 that otherwise would be occupied by information identifying one or more of the message threads 460A-D. Although not illustrated in FIG. 4, in alternative embodiments, the combination of portions of the content item 455 may be overlaid onto information identifying one or more of the message threads 460A-D (e.g., in a pop-up window).

Referring again to FIG. 3A, a request to view an entire content of the content item is received 315 from a subset of each of the multiple sets of users to whom the different combination of portions of the content item was sent 310. The request may be received 315 via the user interface of the online messaging application 135 in which the different combination of the portions of the content item is presented (e.g., upon receiving an interaction from the user(s) with the portions or with an interactive element corresponding to the request). The request may be received 315 at the online messaging application 135 and/or at the online system 140, as shown in FIG. 3B, or at a client device 110 associated with each of the subset of users. In response to receiving 315 the request, the user interface may be updated to include the entire content of the content item (e.g., using the user interface generator 250, a component analogous to the user interface generator 250, or a client device 110 associated with a user of the online messaging application 135). In some embodiments, a request to perform an action (e.g., to make a purchase, subscribe to a service, access a website, install an application, claim an offer, etc.) associated with the content item also may be received from a subset of each of the multiple sets of users to whom the different combination of portions of the content item was sent 310.

Referring back to FIG. 3A, a performance metric associated with the different combination of portions of the content item is then tracked 320 based on the request received 315 from the subset of users to view the entire content of the content item. For example, for each combination of portions of the content item sent 310 for display to a set of users of the online messaging application 135, a performance metric corresponding to a percentage of the set of users who requested to view the entire content of the content item is tracked 320. In some embodiments, the performance metric also or alternatively may be tracked 320 based on requests to perform one or more actions (e.g., to make a purchase, subscribe to a service, access a website, install an application, claim an offer, etc.) associated with the content item received from a subset of each of the sets of users to whom the different combination of portions of the content item was sent 310. As shown in FIG. 3B, in some embodiments, the performance metric may be tracked 320 by the online system 140 (e.g., using the performance module 255). In other embodiments, the performance metric may be tracked 320 by the online messaging application 135 (e.g., using a component analogous to the performance module 255).

Referring now to FIG. 3A, a performance of each portion of the content item is then evaluated 325 based on one or more performance metrics associated with one or more different combinations of portions of the content item. In some embodiments, to evaluate 325 a performance of a portion of the content item, one or more different combinations of the portions of the content item that include the portion of the content item are first identified. In such embodiments, a performance metric associated with each of the different combinations of the portions of the content item is then accessed and a score associated with the portion of the content item is computed based on the performance metric(s) (e.g., as an average of the performance metric(s)). As shown in FIG. 3B, in some embodiments, the performance of each portion of the content item may be evaluated 325 by the online system 140 (e.g., using the performance module 255). In other embodiments, the performance of each portion of the content item may be evaluated 325 by the online messaging application 135 (e.g., using a component analogous to the performance module 255).

Referring again to FIG. 3A, based on the performance of each portion of the content item, an optimal combination of multiple portions of the content item is selected 330. In embodiments in which a score associated with each portion of the content item is computed, the optimal combination of portions of the content item may be selected 330 by first ranking each portion of the content item based on its associated score (e.g., from highest to lowest). In such embodiments, the optimal combination of portions of the content item may then be selected 330 based on the ranking (e.g., by including portions associated with at least a threshold ranking or score among the optimal combination of portions of the content item). In some embodiments, an order in which the optimal combination of portions of the content item may be presented within the user interface of the online messaging application 135 also may be determined based on the performance of each portion of the content item (e.g., based on a ranking or a score associated with each portion of the content item). As shown in FIG. 3B, in some embodiments, the optimal combination of portions of the content item may be selected 330 by the online system 140 (e.g., using the combination selection module 245). In alternative embodiments, the optimal combination of portions of the content item may be selected 330 by the online messaging application 135 (e.g., using a component analogous to the combination selection module 245). In embodiments in which the optimal combination of portions of the content item is selected 330 by the online system 140, the online system 140 subsequently may communicate 333 the optimal combination of portions of the content item to the online messaging application 135, as shown in FIG. 3B. Although not illustrated in FIG. 3B, the online system 140 also or alternatively may communicate the optimal combination of portions of the content item to one or more client devices 110A-N associated with one or more users of the online messaging application 135.

Referring back to FIG. 3A, in some embodiments, an opportunity may then be identified 335 to present a content item to a viewing user of the online messaging application 135 within the user interface of the online messaging application 135 in association with information identifying a set of message threads in which the viewing user is participating. In such embodiments, the optimal combination of portions of the content item may be sent 340 for display to the viewing user within the user interface in association with the information identifying the set of message threads. In some embodiments, the opportunity to present the content item to the viewing user may be identified 335 by the online messaging application 135. For example, as shown in FIG. 3B, upon receiving a request from a viewing user of the online messaging application 135 to view the user interface of the online messaging application 135 that presents information identifying a set of message threads in which the viewing user is participating, the online messaging application 135 may identify 335 an opportunity to present a content item to the viewing user. In this example, the online messaging application 135 may then send 340 the optimal combination of portions of the content item for display to the viewing user within the user interface in association with information identifying the set of message threads in which the viewing user is participating via a client device 110 associated with the viewing user. Although not illustrated in FIG. 3B, in embodiments in which the optimal combination of portions of the content item is communicated 330 to one or more client devices 110A-N associated with one or more users of the online messaging application 135 that includes the viewing user, the opportunity to present the content item to the viewing user may be identified 335 by the client device 110 associated with the viewing user and sent 340 for display to the viewing user (e.g., via a display area of the client device 110).

In some embodiments, upon identifying 335 an opportunity to present a content item to the viewing user of the online messaging application 135, the content item may first be selected for presentation to the viewing user prior to sending 340 the optimal combination of portions of the content item for display to the viewing user. For example, suppose that the online messaging application 135 identifies an opportunity to present the content item to the viewing user upon receiving a request from the viewing user to view the user interface of the online messaging application 135 that presents information identifying a set of message threads in which the viewing user is participating. In this example, the online messaging application 135 may receive user-identifying information associated with the viewing user in association with the request, which the online messaging application 135 may communicate to the online system 140. In the above example, the online system 140 then selects (e.g., using the content selection module 235) one or more content items for presentation to the viewing user based on a set of attributes associated with the viewing user (e.g., attributes stored in the user profile store 205, the action log 220, and/or the edge store 225). Continuing with this example, the optimal combination of portions of the content item may then be sent 340 for display to the viewing user via a client device 110 associated with the viewing user if the content item is selected for display to the viewing user.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    selecting a plurality of different combinations of a plurality of portions of a content item for display to each of a plurality of sets of users of an online messaging application;
    sending the plurality of different combinations of the plurality of portions of the content item for display to each of the plurality of sets of users, the different combinations of the plurality of portions of the content item presented within a user interface of the online messaging application in association with information identifying a set of message threads in which a user of the online messaging application is participating;
    receiving a request from a subset of each of the plurality of sets of users to view an entire content of the content item;
    tracking a performance metric associated with each of the plurality of different combinations of the plurality of portions of the content item based at least in part on the requests received from the subset of each of the plurality of sets of users to view the entire content of the content item;
    computing a performance of each portion of the plurality of portions of the content item, wherein computing the performance of a portion of the plurality of portions of the content item comprises:
        identifying one or more different combinations of the plurality of portions of the content item sent for display to one or more of the plurality of sets of users, each of the one or more different combinations of the plurality of portions of the content item comprising the portion of the content item,
        accessing the performance metric associated with each of the one or more different combinations of the plurality of portions of the content item, and
        computing a score associated with the portion of the content item based at least in part on one or more performance metrics associated with the one or more different combinations of the plurality of portions of the content item; and
    selecting an optimal combination of a subset of the plurality of portions of the content item based at least in part on the performance of each of the plurality of portions of the content item.

2. The method of claim 1, further comprising:
    identifying an opportunity to present the content item to a viewing user of the online messaging application within the user interface of the online messaging application in association with information identifying a set of message threads in which the viewing user is participating; and
    sending the optimal combination of the plurality of portions of the content item for display to the viewing user.

3. The method of claim 1, wherein tracking the performance metric associated with the different combination of the plurality of portions of the content item is further based at least in part on a request received from an additional subset of each of the plurality of sets of users to perform one or more actions associated with the content item.

4. The method of claim 3, wherein the one or more actions associated with the content item are selected from the group consisting of: making a purchase associated with the content item, subscribing to a service associated with the content item, accessing a website associated with the content item, installing an application associated with the content item, claiming an offer associated with the content item, and any combination thereof.

5. The method of claim 1, wherein the plurality of portions of the content item are selected from the group consisting of: a headline, a subtitle, an image, text content, a video, a hyperlink, an interactive element, and any combination thereof.

6. The method of claim 1, wherein the different combination of the plurality of portions of the content item are selected for display to each of the plurality of sets of users of the online messaging application based at least in part on a set of rules maintained in the online messaging application.

7. The method of claim 6, wherein selecting the different combination of the plurality of portions of the content item for display to each of the plurality of sets of users of the online messaging application comprises:
    identifying a set of candidate portions of the content item from the plurality of portions of the content item based at least in part on the set of rules; and
    selecting the different combination of the plurality of portions of the content item from the set of candidate portions of the content item.

8. The method of claim 6, wherein the set of rules describes a maximum proportion of the user interface eligible to be occupied by one or more of the plurality of portions of the content item.

9. The method of claim 1, wherein selecting the optimal combination of the plurality of portions of the content item comprises:
    ranking each of the plurality of portions of the content item based at least in part on the score associated with the portion of the content item; and selecting the optimal combination of the plurality of portions of the content item based at least in part on the ranking.

10. The method of claim 1, wherein selecting an optimal combination of a subset of the plurality of the portions of the content item further comprises:
determining an order of the subset of the plurality of portions of the content item based on the performance metrics of the identified one or more different combinations of the plurality of portions of the content item.

11. A computer program product comprising a non-transitory computer readable storage medium having instructions encoded thereon that, when executed by a processor, cause the processor to:
select a plurality of different combinations of a plurality of portions of a content item for display to each of a plurality of sets of users of an online messaging application;
send the plurality of different combinations of the plurality of portions of the content item for display to each of the plurality of sets of users, the different combinations of the plurality of portions of the content item presented within a user interface of the online messaging application in association with information identifying a set of message threads in which a user of the online messaging application is participating;
receive a request from a subset of each of the plurality of sets of users to view an entire content of the content item;
track a performance metric associated with each of the plurality of different combinations of the plurality of portions of the content item based at least in part on the requests received from the subset of each of the plurality of sets of users to view the entire content of the content item;
compute a performance of each portion of the plurality of portions of the content item, wherein computing the performance of a portion of the plurality of portions of the content item comprises:
identifying one or more different combinations of the plurality of portions of the content item sent for display to one or more of the plurality of sets of users, each of the one or more different combinations of the plurality of portions of the content item comprising the portion of the content item,
accessing the performance metric associated with each of the one or more different combinations of the plurality of portions of the content item, and
computing a score associated with the portion of the content item based at least in part on one or more performance metrics associated with the one or more different combinations of the plurality of portions of the content item; and
select an optimal combination of a subset of the plurality of portions of the content item based at least in part on the performance of each of the plurality of portions of the content item.

12. The computer program product of claim 11, wherein the computer-readable storage medium further has instructions encoded thereon that, when executed by the processor, cause the processor to:
identify an opportunity to present the content item to a viewing user of the online messaging application within the user interface of the online messaging application in association with information identifying a set of message threads in which the viewing user is participating; and
send the optimal combination of the plurality of portions of the content item for display to the viewing user.

13. The computer program product of claim 11, wherein track the performance metric associated with the different combination of the plurality of portions of the content item is further based at least in part on a request received from an additional subset of each of the plurality of sets of users to perform one or more actions associated with the content item.

14. The computer program product of claim 13, wherein the one or more actions associated with the content item are selected from the group consisting of: making a purchase associated with the content item, subscribing to a service associated with the content item, accessing a website associated with the content item, installing an application associated with the content item, claiming an offer associated with the content item, and any combination thereof.

15. The computer program product of claim 11, wherein the plurality of portions of the content item are selected from the group consisting of: a headline, a subtitle, an image, text content, a video, a hyperlink, an interactive element, and any combination thereof.

16. The computer program product of claim 11, wherein the different combination of the plurality of portions of the content item are selected for display to each of the plurality of sets of users of the online messaging application based at least in part on a set of rules maintained in the online messaging application.

17. The computer program product of claim 16, wherein select the different combination of the plurality of portions of the content item for display to each of the plurality of sets of users of the online messaging application comprises:
identify a set of candidate portions of the content item from the plurality of portions of the content item based at least in part on the set of rules; and
select the different combination of the plurality of portions of the content item from the set of candidate portions of the content item.

18. The computer program product of claim 16, wherein the set of rules describes a maximum proportion of the user interface eligible to be occupied by one or more of the plurality of portions of the content item.

19. The computer program product of claim 11, wherein select the optimal combination of the plurality of portions of the content item comprises:
rank each of the plurality of portions of the content item based at least in part on the score associated with the portion of the content item; and
select the optimal combination of the plurality of portions of the content item based at least in part on the ranking.

20. The computer program product of claim 11, wherein the instructions that cause the processor to select an optimal combination of a subset of the plurality of the portions of the content item further cause the processor to:
determine an order of the subset of the plurality of portions of the content item based on the performance metrics of the identified one or more different combinations of the plurality of portions of the content item.

* * * * *